(12) United States Patent
Shiozaki et al.

(10) Patent No.: US 11,951,728 B2
(45) Date of Patent: Apr. 9, 2024

(54) FIBER-REINFORCED PLASTIC MOLDED BODY

(71) Applicant: Toray Industries, Inc., Tokyo (JP)

(72) Inventors: Keisuke Shiozaki, Nagoya (JP); Kenya Okada, Nagoya (JP); Yuji Fukunishi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 96 days.

(21) Appl. No.: 17/913,925

(22) PCT Filed: Mar. 11, 2021

(86) PCT No.: PCT/JP2021/009721
§ 371 (c)(1),
(2) Date: Sep. 23, 2022

(87) PCT Pub. No.: WO2021/200008
PCT Pub. Date: Oct. 7, 2021

(65) Prior Publication Data
US 2023/0339206 A1    Oct. 26, 2023

(30) Foreign Application Priority Data

Mar. 31, 2020   (JP) ................. 2020-062691

(51) Int. Cl.
*B32B 5/12*    (2006.01)
*B32B 5/02*    (2006.01)
(Continued)

(52) U.S. Cl.
CPC ............... *B32B 5/12* (2013.01); *B32B 5/024* (2013.01); *B32B 5/18* (2013.01); *B32B 5/245* (2013.01);
(Continued)

(58) Field of Classification Search
None
See application file for complete search history.

(56) References Cited

U.S. PATENT DOCUMENTS

| 10,532,537 B2 | 1/2020 | Sasaki et al. |
| 2019/0389174 A1 | 12/2019 | Sasaki et al. |
| 2022/0168993 A1 | 6/2022 | Shiozaki et al. |

FOREIGN PATENT DOCUMENTS

| JP | 2003-158143 A | 5/2003 |
| JP | 2007-38519 A | 2/2007 |

(Continued)

OTHER PUBLICATIONS

International Search Report dated Apr. 27, 2021, of corresponding International Application No. PCT/JP2021/009721 along with an English translation.

*Primary Examiner* — Alexander S Thomas
(74) *Attorney, Agent, or Firm* — DLA Piper LLP (US)

(57) ABSTRACT

A fiber-reinforced plastic molded body includes: a laminated body having a configuration of laminating a sandwich structure member obtained by laminating one layer or two or more layers of a unidirectional fiber-reinforced resin constituted from a unidirectional continuous fiber and a matrix resin on both surfaces of a core layer and one layer or two or more layers of a woven fiber-reinforced resin constituted from a woven fiber and a matrix resin such that the one layer or two or more layers of a woven fiber-reinforced resin are disposed on the design surface side of the unidirectional fiber-reinforced resin; and the resin member is not substantially exposed in a projection plane from the woven fiber-reinforced resin side.

13 Claims, 9 Drawing Sheets

(51) Int. Cl.
  *B32B 5/18*    (2006.01)
  *B32B 5/24*    (2006.01)
  *B32B 5/26*    (2006.01)
  *B32B 27/12*   (2006.01)
  *B32B 27/32*   (2006.01)
  *B32B 27/36*   (2006.01)

(52) U.S. Cl.
  CPC .............. *B32B 5/262* (2021.05); *B32B 27/12* (2013.01); *B32B 27/32* (2013.01); *B32B 27/365* (2013.01); *B32B 2250/40* (2013.01); *B32B 2260/021* (2013.01); *B32B 2260/046* (2013.01); *B32B 2262/101* (2013.01); *B32B 2266/025* (2013.01)

(56) References Cited

FOREIGN PATENT DOCUMENTS

| | | |
|---|---|---|
| JP | 2012-76464 A | 4/2012 |
| JP | 2015-98173 A | 5/2015 |
| JP | 2015-193119 A | 11/2015 |
| WO | 2017/115640 A1 | 7/2017 |
| WO | 2018/110293 A1 | 6/2018 |
| WO | 2020/202903 A1 | 10/2020 |

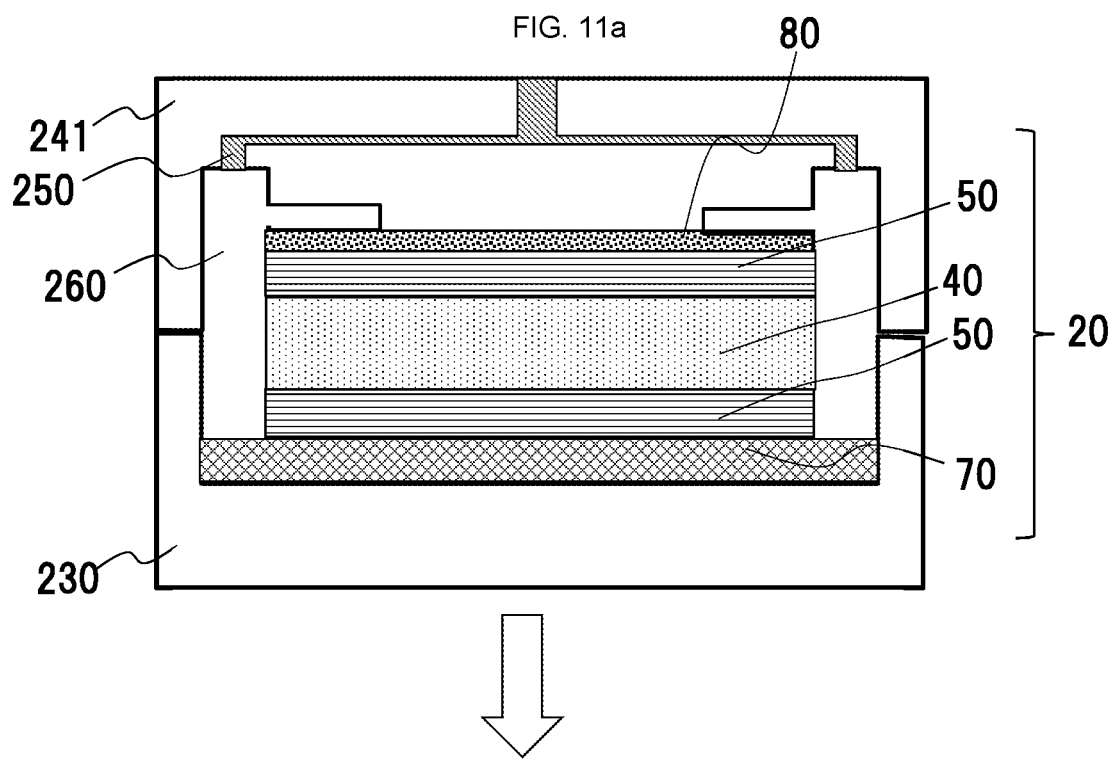
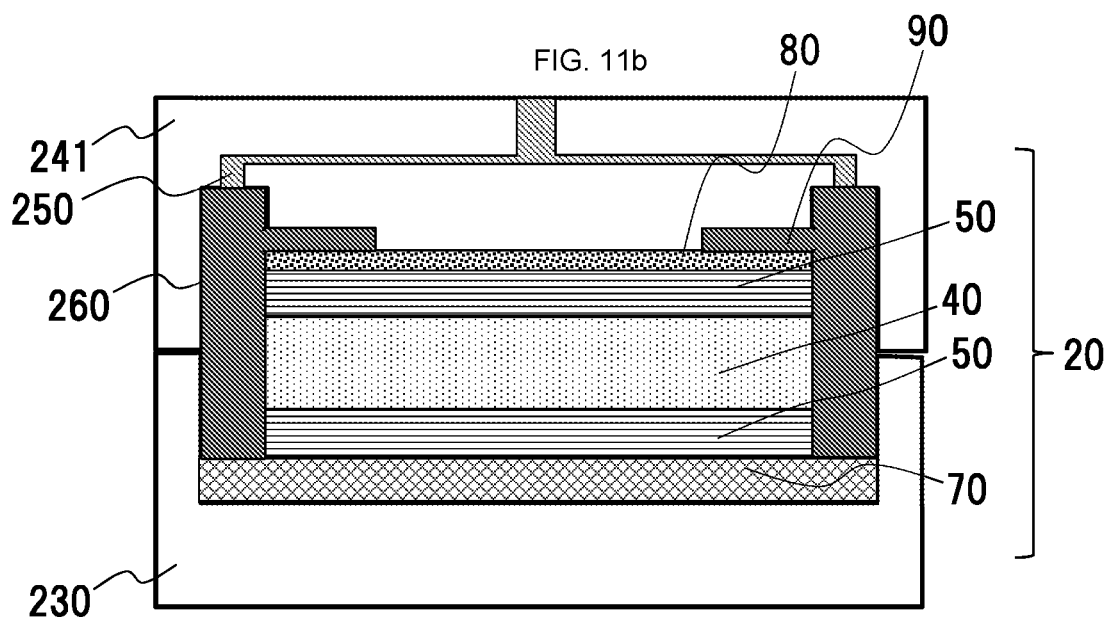

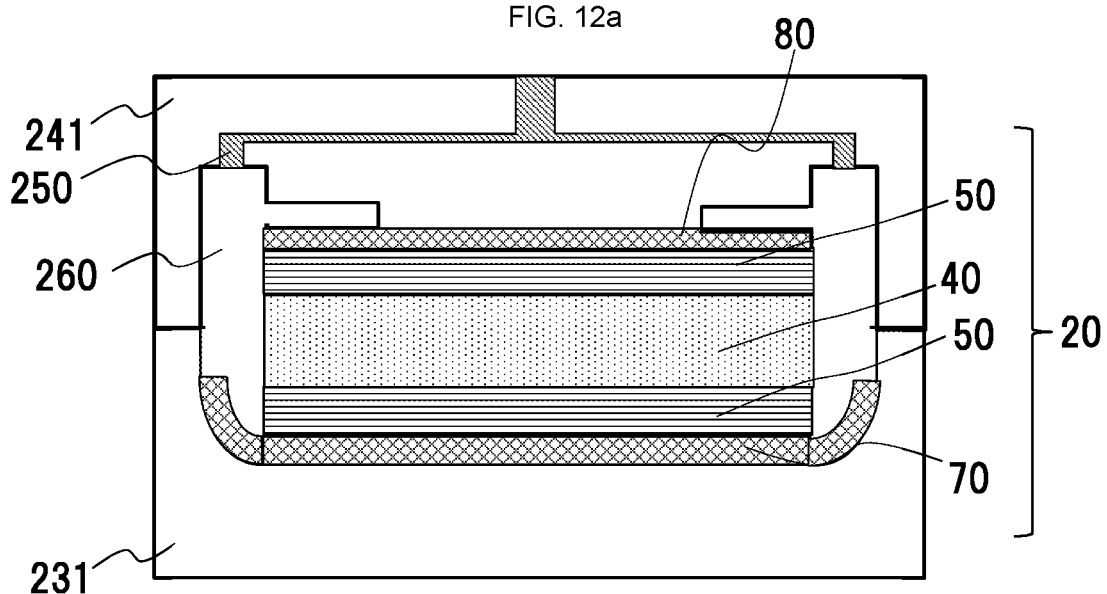
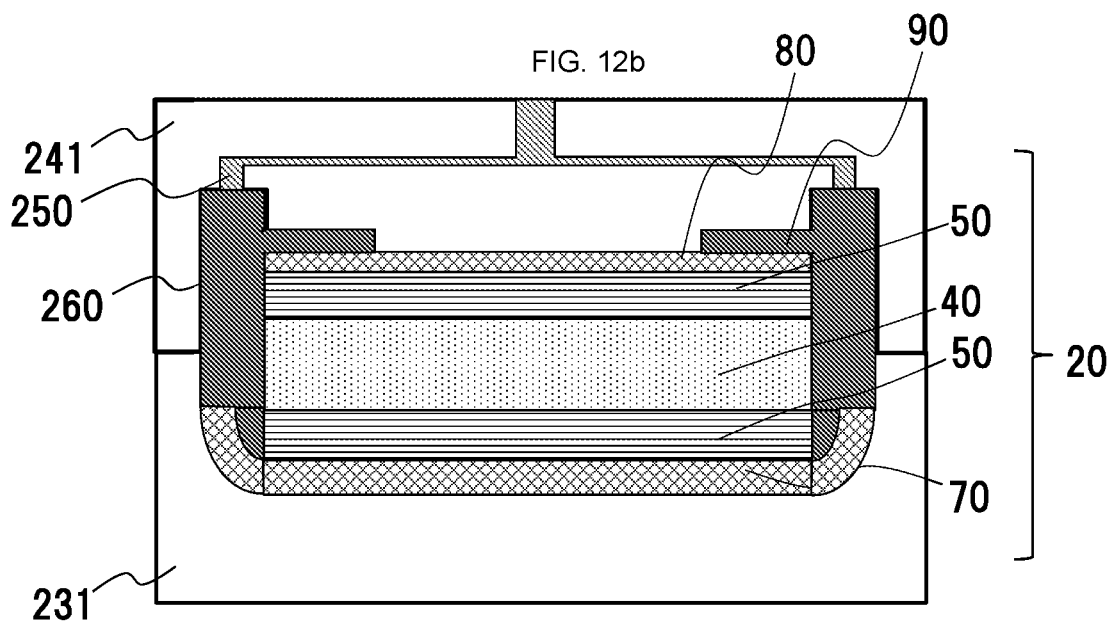

FIBER-REINFORCED PLASTIC MOLDED BODY

TECHNICAL FIELD

This disclosure relates to a fiber-reinforced plastic molded body suitably used as component parts or housings of personal computers, office automation equipment, cellular phones or the like requiring light weight, high strength and high rigidity with thin material.

BACKGROUND

Recently, electric/electronic equipment has been required to have a small size and light weight since personal computers, office automation equipment, audiovisual equipment, cellular phones, telephone equipment, home electric appliances and toys become portable. For the purpose of achieving such a requirement, thin materials have been used for device component parts such as housings having high strength and high rigidity with thin material not to greatly bend, contact and break internal component parts when external load is applied to the device.

Because housings to contain electronic equipment such as laptop personal computers inside are seen in public and touched directly by users, design and surface appearance quality are important. Therefore, housings are generally decorated by exterior painting to manage the surface quality according to a strict appearance standard. In recent years, the design trend has diversified so that advanced painting technologies such as clear metallic painting and pearl clear painting are often used to achieve strictly high surface quality. Specifically, it is important for sales promotion that woven carbon fiber as a reinforcing fiber base material has a novel surface design.

JP 2015-193119 A discloses a fiber-reinforced plastic laminate in which at least a core material constituted of a resin foam body having an independent foaming cell and a skin material constituted of reinforced fiber and matrix resin are laminated, wherein at least one layer of the thinner skin material is provided with unidirectional fiber-reinforced plastic layer, at least one layer of the thicker skin material having a laminate structure is provided with woven fiber-reinforced plastic layer, and one outermost layer of prepreg A as upper skin material 3 comprising woven carbon fiber and epoxy resin and four layers of prepreg B as inner material comprising unidirectional carbon fiber and epoxy resin are laminated. With that configuration, well-designed good surface appearance as well as rigidity and lightness can be maintained by suppressing deterioration of surface appearance caused by so-called air-bubble void inside the structure.

WO 2018/110293 discloses a method comprising: placing a board (A), whose one surface is a design surface, inside a member (B) having a frame shape, at a condition where at least a part of the board (A) is apart from the member (B); and then bonding and integrating the board (A) and the member (B) with each other at least at an outer peripheral edge section of the board (A) by injection molding a bonding resin (C) into a space between the board (A) and the member (B). According to the method thereof, a plurality of structures are bonded with a high bonding strength, the bonding boundary has a good smoothness, warping can be mitigated even when the molded body has a board constituent member, and making it light in weight and thin in thickness can be realized.

JP 2007-038519 A discloses a composite molded component (I) comprising: a laminated member (II) having a sandwich construction; and a resin member (III) formed around at least a portion of a plate end part of the laminated member (II), wherein the sandwich construction has a hard member layer (IIa) and a flexible member layer (IIb), and wherein at a mating section of the laminated member (II) and the resin member (III), at least a portion of the resin member (III) has a convex shape formed to the flexible member layer (IIb). With that configuration, light weight, high strength and high rigidity as well as thin wall nature can be achieved.

WO 2017/115640 discloses a sandwich structure comprising a skin layer and a core layer, wherein the skin layer is a fiber reinforced resin layer (X) comprising a continuous fiber and a matrix resin (A) and at least one layer of each unidirectional fiber reinforced resin layer and a woven fiber reinforced resin layer is laminated. With that configuration, light, strong and rigid upright part having a complicated shape such as rib projecting in an out-of-plane direction of a skin layer can be formed by a simple method such as single molding.

JP 2012-76464 A discloses a method of manufacturing a sandwich panel comprising a core material impregnated with a matrix resin and a skin material containing a fiber-reinforced resin, wherein the skin material is a fiber-reinforced resin having a one-layer structure or a multilayer laminated structure, and at least one layer in the fiber-reinforced resin is a fiber-reinforced resin layer containing continuous reinforcing fibers while the fiber-reinforced resin layer containing continuous reinforcing fibers contains woven fabric of reinforcing fiber. With that configuration, because the skin material is made of a fiber-reinforced resin with high rigidity and the core material is made of a resin having an apparent density lower than that of the skin material thereby reducing the overall thickness, the fiber-reinforced resin sandwich panel can be lightweight and have excellent X-ray transparency while maintaining rigidity.

It is required that housings used for electric/electronic equipment have a smoothness and a good appearance design of on surface of component members. For example, there have been attempts to enhance appearance design with specific surface formation by placing a sheet-shaped fiber-reinforced base material such as woven fabric on the surface of fiber-reinforced plastic molded body. However, woven fabrics of which carbon fiber has a rippling shape might deteriorate strength such as flexural rigidity although the surface can be provided with a woven pattern on the surface by placing sheet-shaped woven fiber-reinforced base material such as multiaxial woven fabric on the surface layer of fiber-reinforced plastic molded body.

Even when the fiber-reinforced plastic has a multilayer structure comprising fiber-reinforced base material and sheet-shaped woven fiber-reinforced base material such as woven fabric and multiaxial woven fabric to secure a predetermined strength and rigidity, the molded body having asymmetric laminate structure in the thickness direction might have warpage itself caused by thermal contraction after molding process.

To solve that problem, it is possible that the cavity of the die of the fiber-reinforced resin plate member is formed into a shape preliminarily offsetting the warpage deformation caused by the linear expansion coefficient, as disclosed in JP 2015-98173 A or JP 2003-158143 A. However, it is necessary to make a special order to produce the die after confirming the shape of sample dies at increased cost.

With respect to the above-described problem, rigidity decrease can be supplemented by placing skin material made of unidirectional fiber-reinforced plastic on both sides of the core material according to JP 2015-193119 A. The high rigidity can be maintained as improving appearance design by placing woven fabric on the outermost layer of skin material as well. However, JP 2015-193119 A fails to recognize the problem of warpage likely to be caused on the asymmetrically layered molded body or suggest any measures to reduce the warpage.

WO 2018/110293 discloses that board (A) and member (B) are bonded by high strength with bonding resin (C) injected to the outer peripheral edge section and that board (A) and bonding resin (C) are bonded with thermoplastic resin layer (D) to make an asymmetric layer structure. However, WO 2018/110293 fails to recognize the problem of warpage possibly caused on the asymmetrically layered molded body by providing thermoplastic resin layer (D) or suggest any measures to reduce the warpage.

JP 2007-038519 A discloses that hard member layer (IIa) is made of a sheet containing unidirectionally oriented continuous reinforcing fibers or a sheet containing continuous reinforcing fiber woven fabric and that resin member (III) is injected around the plate edge section of laminated member (II). However, JP 2007-038519 A fails to disclose asymmetric layered structure with laminated member (II) or relationship between injected resin member (III) and warpage of the molded body, or recognize the problem of warpage and suggest any measures for the warpage.

WO 2017/115640 discloses that the skin layer is a fiber reinforced resin layer (X) comprising a continuous fiber and a matrix resin (A) and at least one layer of each unidirectional fiber reinforced resin layer and a woven fiber reinforced resin layer is laminated to obtain characteristics such as light weight, high strength and high rigidity. However, WO 2017/115640 fails to recognize the problem of warpage possibly caused on the asymmetrical layered molded body by providing a woven fiber-reinforced resin layer on the surface layer of skin material or suggest any measures to reduce the warpage.

JP 2012-76464 A discloses that the strength and the elastic modulus of the skin material provided with fiber-reinforced resin layer containing unidirectionally oriented reinforcing fibers and woven reinforcing fibers can be designed efficiently. However, JP 2012-76464 A fails to recognize the problem of warpage possibly caused on the asymmetrical layered molded body by providing woven fiber-reinforced resin layer or suggest any measures to reduce the warpage.

It could therefore be helpful to provide a fiber-reinforced plastic molded body having light weight, high strength and high rigidity with thin material, in which fiber-reinforced plastic molded body is provided with sheet-shaped woven fiber reinforcing base material on the surface so that specific surface formation is given to enhance appearance design and smoothness is achieved by suppressing warpage generation of molded body even though having asymmetric layer structure.

SUMMARY

We thus provide:

[1] A fiber-reinforced plastic molded body comprising: a laminate (A) having a planar structure of a fiber-reinforced resin; and a resin material (B) joined with a part or a whole region of an outer peripheral side face of the laminate (A), the laminate (A) having layers of: a sandwich structure material (E) made by laminating one or more layers of a unidirectional fiber-reinforced resin (D) of a unidirectional continuous fiber and a matrix resin on both surfaces of core layer (C); and one or more layers of a woven fiber-reinforced resin (F) of woven fiber and a matrix resin laminated on a surface of design side of the unidirectional fiber-reinforced resin (D), wherein the resin material (B) is not substantially exposed in a projection plane from the woven fiber-reinforced resin (F).

[2] The fiber-reinforced plastic molded body according to [1], wherein the woven fiber-reinforced resin (F) or both the woven fiber-reinforced resin (F) and the unidirectional fiber-reinforced resin (D) laminated on the woven fiber-reinforced resin (F) has an extended section of which width is more than a full width of core layer (C) and which covers the resin material (B).

[3] The fiber-reinforced plastic molded body according to [2], further comprising a first curved section of the extended section curved to cover the resin material (B).

[4] The fiber-reinforced plastic molded body according to [1], wherein an end of the laminate (A) has a second curved section to cover the resin material (B).

[5] The fiber-reinforced plastic molded body according to [3] or [4], wherein the first curved section or the second curved section covers at least a part of an outer edge of the resin material (B).

[6] The fiber-reinforced plastic molded body according to any one of [1] to [5], wherein a ratio of Am2/Am1 is 2 to 25, the Am1 being a partial weight of the resin material (B) existing in a design side region (R1) while the Am2 being a partial weight of the resin material (B) existing in a non-design side region (R2), when the laminate (A) is equally divided with respect to a center line in a thickness direction into the design side region (R1) and the non-design side region (R2).

[7] The fiber-reinforced plastic molded body according to any one of [1] to [6], wherein the sandwich structure material (E) has a flexural rigidity greater than that of the woven fiber-reinforced resin (F).

[8] The fiber-reinforced plastic molded body according to any one of [1] to [7], wherein a ratio of Md/Mf is 1.2 to 17, the Md being a flexural modulus of the unidirectional fiber-reinforced resin (D) and the Mf being a flexural modulus of the woven fiber-reinforced resin (F).

[9] The fiber-reinforced plastic molded body according to any one of [1] to [8], wherein the unidirectional fiber-reinforced resin (D) has a flexural modulus Md of 100 to 500 GPa while the woven fiber-reinforced resin (F) has a flexural modulus Mf of 30 to 80 GPa.

[10] The fiber-reinforced plastic molded body according to any one of [1] to [9], wherein a ratio of Te/Tf is 1.2 to 40, the Te being a material thickness of the sandwich structure material (E) and the Tf being a material thickness of the woven fiber-reinforced resin (F).

[11] The fiber-reinforced plastic molded body according to any one of [1] to [10], wherein the sandwich structure material (E) has a material thickness Te of 0.6 to 2 mm while the woven fiber-reinforced resin (F) has a material thickness Tf of 0.05 to 0.5 mm.

[12] The fiber-reinforced plastic molded body according to any one of [1] to [11], wherein the laminate (A) and the resin material (B) are joined through a joint layer (G) provided in a part or a whole region of an outer peripheral edge section of the unidirectional fiber-reinforced resin (D) at a non-design side of laminate (A).

[13] The fiber-reinforced plastic molded body according to any one of [1] to [12], wherein the core layer (C) is made of a resin foam or a porous base material comprising a discontinuous fiber and a thermoplastic resin.

Our fiber-reinforced plastic molded bodies can achieve light weight, high strength and high rigidity with thin material by the configuration in which fiber-reinforced plastic molded body is provided with sheet-shaped woven fiber reinforcing base material on the surface so that specific surface formation is given to enhance appearance design and smoothness is achieved by suppressing warpage generation of molded body even though having asymmetric layer structure.

BRIEF DESCRIPTION OF THE DRAWINGS

FIG. 8a is a cross section view of laminate (A) placed in an injection molding die while FIG. 8b is a cross section view of our fiber-reinforced plastic molded body made by injecting resin material (B) from an injection gate.

FIGS. 11a-11b are a process chart showing a manufacturing process of our fiber-reinforced plastic molded body of laminate (A) joined with resin material (B) to cover a design side surface, where FIG. 11a is a cross section view of laminate (A) placed in an injection molding die while FIG. 11b is a cross section view of our fiber-reinforced plastic molded body made by injecting resin material (B) from an injection gate.

FIGS. 12a-12b are a process chart showing a manufacturing process of our fiber-reinforced plastic molded body of laminate (A) coated with resin material (B) in which woven fiber-reinforced resin layer (F) extends toward a side face, where FIG. 12a is a cross section view of laminate (A) placed in an injection molding die while FIG. 12b is a cross section view of our fiber-reinforced plastic molded body made by injecting resin material (B) from an injection gate.

EXPLANATION OF SYMBOLS

Figure 1:
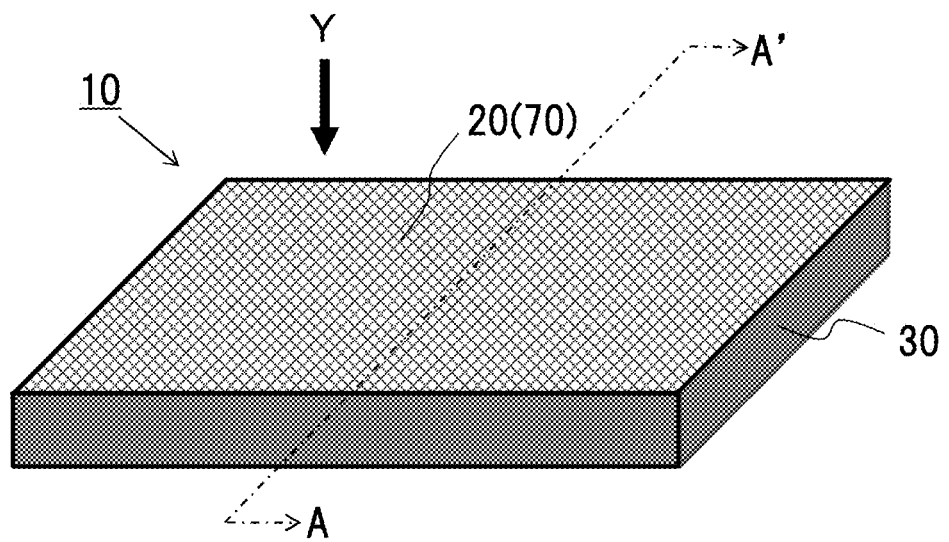
FIG. 1 is a perspective view showing a fiber-reinforced plastic molded body according to an example.

10: fiber-reinforced plastic molded body
20: laminate (A)
30: resin material (B)
40: core layer (C)
50: unidirectional fiber-reinforced resin (D)
60: sandwich structure material (E)
70: woven fiber-reinforced resin (F)
71: surface region of woven fiber-reinforced resin
72: R-shaped region of woven fiber-reinforced resin
70a: woven fiber base material
70b: first curved section
70c: second curved section
80: joint layer (G)
90: resin material (B) joined with a flat section of outer peripheral edge section
100: standing-wall section
110: material thickness of laminates (A)
120: center line for division
130: region (R1) where woven fiber-reinforced resin (F) is laminated
140: region (R2) where woven fiber-reinforced resin (F) is not laminated
210: press forming lower die
220: press forming upper die
230: injection molding lower die (M1)
231: injection molding lower die (M2)
240: injection molding upper die (MM1)
241: injection molding upper die (MM2)
250: injection gate
260: space for molding resin material (B)
300: flat plate
310: laser distance measurer
320: datum level
330, 340: endmost edge
350: warpage lower datum line
360: warpage upper datum line

DETAILED DESCRIPTION

Hereinafter, our molded bodies will be explained with reference to figures along with examples. However, this disclosure is not limited in particular to the figures and Examples described herein.

Our fiber-reinforced plastic molded body 10 comprises laminate (A) 20 having a planar structure of fiber-reinforced resin and resin material (B) 30 joined with a part or a whole region of outer peripheral side face of the laminate (A) 20, the laminate (A) 20 having layers of: sandwich structure material (E) 60 made by laminating one or more layers of unidirectional fiber-reinforced resin (D) 50 of unidirectional continuous fiber and matrix resin on both surfaces of core layer (C) 40; and one or more layers of woven fiber-reinforced resin (F) 70 of woven fiber and matrix resin laminated on a surface of design side of the unidirectional fiber-reinforced resin (D) 50, wherein the resin material (B) 30 is not substantially exposed in a projection plane from the woven fiber-reinforced resin (F) 70.

Figure 2:
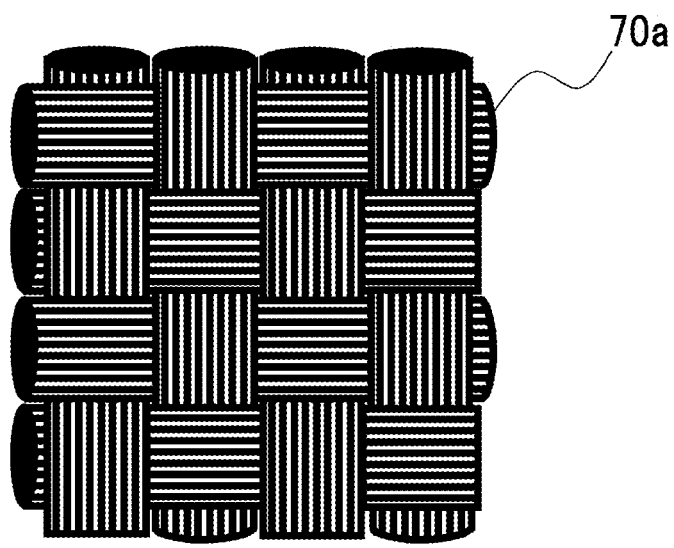
FIG. 2 is a plan view showing an example of our woven fiber base material.

Our fiber-reinforced plastic molded body 10 has a structure of laminate (A) 20 of which a part or a whole region outer peripheral side face is joined with resin material (B) of reinforcing fiber and thermoplastic resin as shown in FIG. 1. As shown in FIG. 2, woven fiber-reinforced resin (F) 70 of woven fiber 70a is laminated on a surface of design side of laminate (A) 20. Woven fiber-reinforced resin (F) 70 provided on a surface layer of laminate (A) 20 can signalize a fabric pattern with unique surface formation so that appearance design is improved.

It is important that resin material (B) 30 is not exposed substantially in a plane projected from the woven fiber-reinforced resin (F) 70 of fiber-reinforced plastic molded body 10. Specifically, it is important that resin material (B) 30 is not exposed substantially in a projection plane in the direction of arrow (Y) in FIG. 1 so that only woven fiber-reinforced resin (F) 70 can be seen.

Figure 3A:
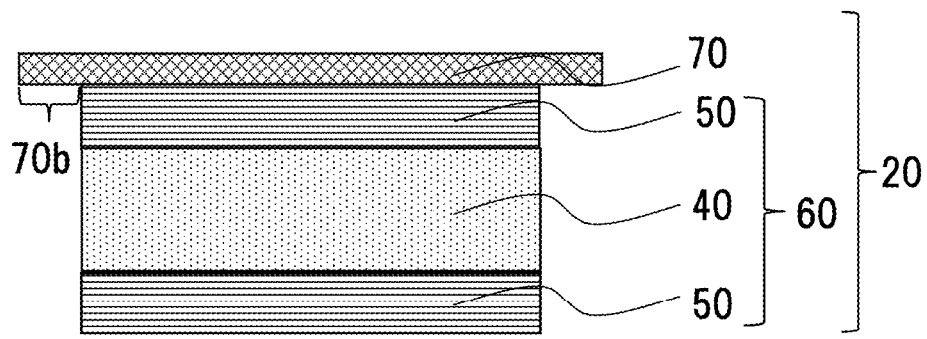
FIG. 3a is a cross section view showing an example of laminate (A) of which only woven fiber-reinforced resin layer (F) has a width beyond the full width of sandwich structure material (E).

Laminate (A) 20 will be explained further. FIG. 3a is a cross section view showing an example of laminate (A) 20. One or more layers of unidirectional fiber-reinforced resin (D) 50 are laminated on both sides of core layer (C) 40 to make sandwich structure material (E) 60. Woven fiber-reinforced resin (F) 70 is further laminated on a surface of design side of sandwich structure material (E) 60 to make laminate (A) 20. When a whole surface of design side has a woven appearance, excellent design can be exhibited for electric/electronic devices.

It is preferable that either woven fiber-reinforced resin (F) 70 or both woven fiber-reinforced resin (F) 70 and unidirectional fiber-reinforced resin (D) 50 laminated on the woven fiber-reinforced resin (F) 70 has an extended section of which width is more than the full width of core layer (C) 40 and which covers resin material (B) 30.

Figure 3B:
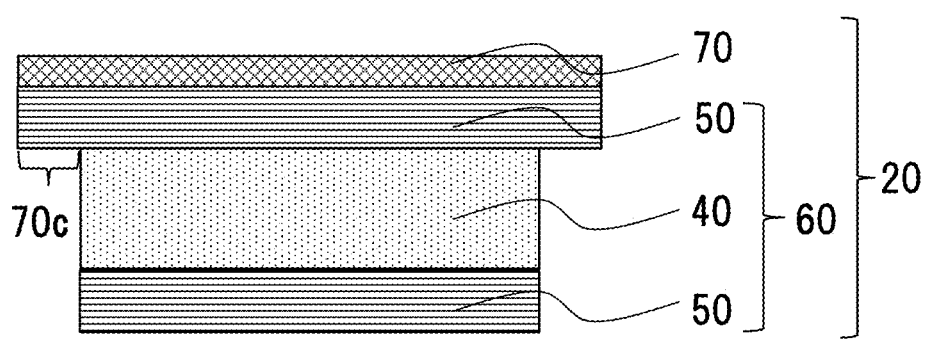
FIG. 3b is a cross section view showing an example of laminate (A) of which woven fiber-reinforced resin layer (F) and unidirectional fiber-reinforced resin (D) on the design side have a width beyond the full width of sandwich structure material (E).

When laminate (A) 20 has a small warpage or it is necessary to reduce weight of fiber-reinforced plastic molded body 10, it is preferable that the extended section of the woven fiber-reinforced resin (F) 70 has a width of more than the full width of sandwich structure material (E) 60 as shown in FIG. 3a. On the other hand, when it is difficult to suppress warpage only by woven fiber-reinforced resin (F) 70 laminate (A) 20 because of relatively great warpage or the like, it is preferable the extended section is further provided in unidirectional fiber-reinforced resin (D) 50 laminated on the woven fiber-reinforced resin (F) 70 as shown in FIG. 3b.

When the extended section is curved, it is possible that only woven fiber-reinforced resin (F) 70 is curved to make a first curved section shown in FIG. 3a. It is also possible that a part of a whole layer of end of sandwich structure material E (60) is curved to make a second curved section shown in FIG. 3b.

Such an extended section can be formed from unidirectional fiber-reinforced resin (D) 50 having a width more than the full width of core layer (C) 40 or woven fiber-reinforced resin (F) 70 preliminarily prepared. In other ways, it is possible that an extended section is left by cutting laminate (A) 20 formed into a size of fiber-reinforced plastic molded body 10 or that an extended section is left by cutting unidirectional fiber-reinforced resin (D) 50 at the side opposite to laminated core layer (C) 40 and woven fiber-reinforced resin (F) 70. It is also possible that an extended section is formed by deforming laminate (A) 20 at the time of press forming or injection molding, or alternatively by deforming laminate (A) 20 with a fixture.

Figure 4A:
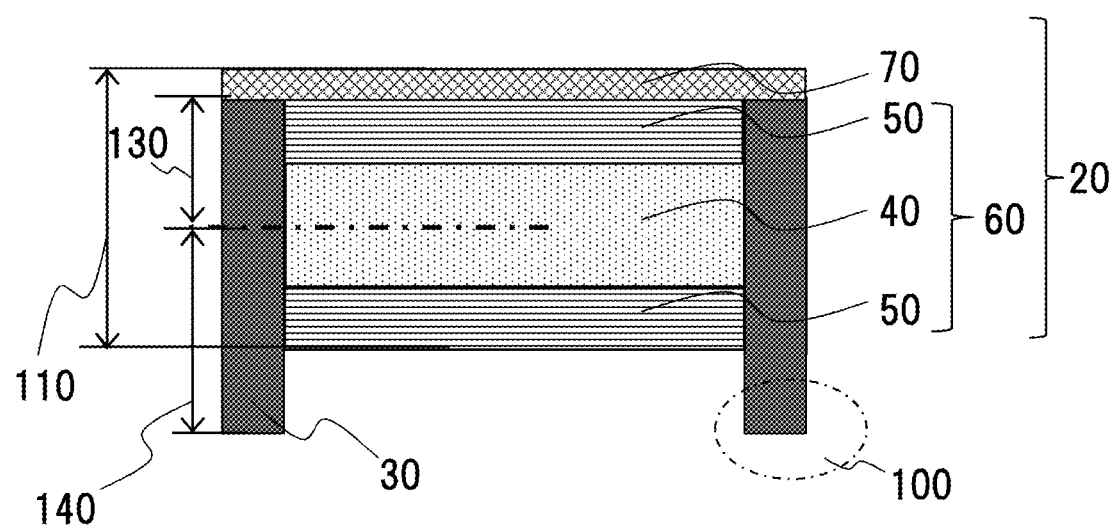
FIG. 4a is a cross section viewed along line A-A' of FIG. 1, showing an example of our fiber-reinforced plastic molded body of laminate (A) joined with resin material (B) to cover a design side surface.

Resin material (B) 30 can be joined by various methods. FIG. 4a is a cross section of fiber-reinforced plastic molded body 10 made by joining resin material (B) 30 with laminate (A) 20 shown in FIG. 3a and shows the extended section of woven fiber-reinforced resin (F) 70 covers resin material (B) 30.

Figure 4B:
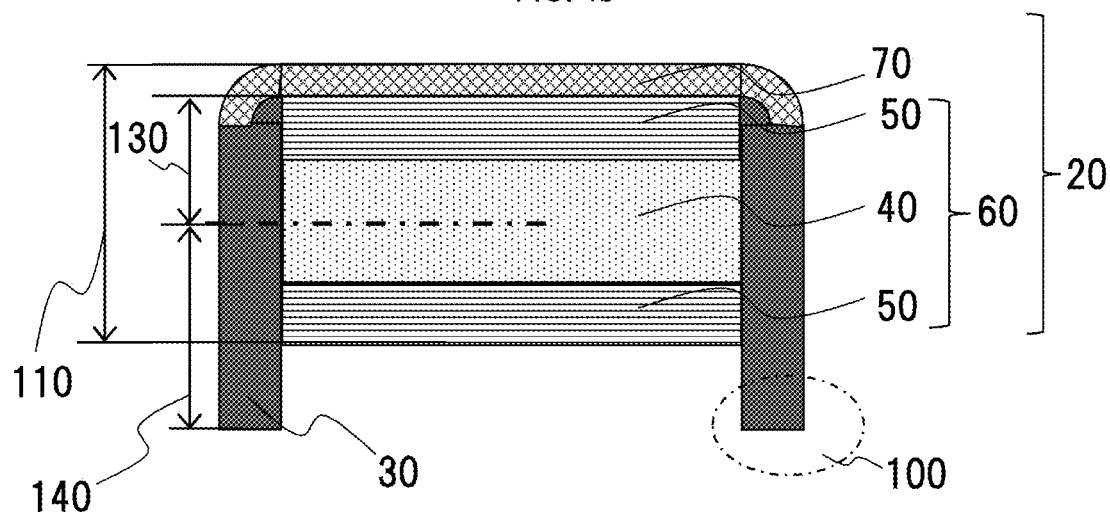
FIG. 4b is a cross section viewed along line A-A' of FIG. 1, showing an example of our fiber-reinforced plastic molded body of laminate (A) of which woven fiber-reinforced resin layer (F) extends toward a side face to be joined with resin material (B).

It is preferable that a curved section covering resin material (B) 30 is formed by curving the extended section. As shown in FIG. 4b, it is possible that the extended section of woven fiber-reinforced resin (F) 70 is curved at the non-design side surface side to cover resin material (B) 30 partially inside. With such a curved shape, woven fabric appearance can be given to a whole region including the projection plane of the arrow direction (Y) of FIG. 1

If resin material (B) 30 is exposed by a width of 5 mm or less in the plane projected from the side of woven fiber-reinforced resin (F) 70 of fiber-reinforced plastic molded body 10, the resin material (B) 30 is regarded as not substantially exposed in a projection plane from the woven fiber-reinforced resin (F) 70. It is preferable that the resin material (B) 30 is exposed by a width of 3 mm or less, preferably 1 mm or less, for the resin material (B) 30 can be seen when it is exposed by a width of more than 5 mm from the end of product in the projection plane.

It is possible that the outer peripheral side face where laminate (A) 20 and resin material (B) 30 are joined has different exposure widths according to product design of electric/electronic devices. Namely, it is not necessary for resin material (B) 30 to be exposed by the same width all around. Also, the extended section can be provided only at a place important for design from a viewpoint of mass productivity.

The outer peripheral side face to join resin material (B) 30 is an end face having a surface orthogonal to the flat section of the periphery of laminate (A) 20 having a planar structure. FIGS. 4a and 4b show resin material (B) 30 partially being joined with the outer peripheral side face.

Laminate (A) 20 is provided with woven fiber-reinforced resin (F) 70 on the design side surface and has a laminated structure asymmetric in the thickness direction. Laminate (A) 20 is generally formed by press forming as described later. Although laminate (A) 20 has a flat shape without warpage just after the press forming, it might be deformed into a shape of which bottom is protruded by thermal contraction caused by the cooling. We believe that such a warpage is caused by thermal contraction of which amounts are different between the non-design side surface and the design side surface on which woven fiber-reinforced resin (F) 70 is laminated. This warpage might cause troubles of contact between internal parts and a housing of electric device being operated.

Figure 5:
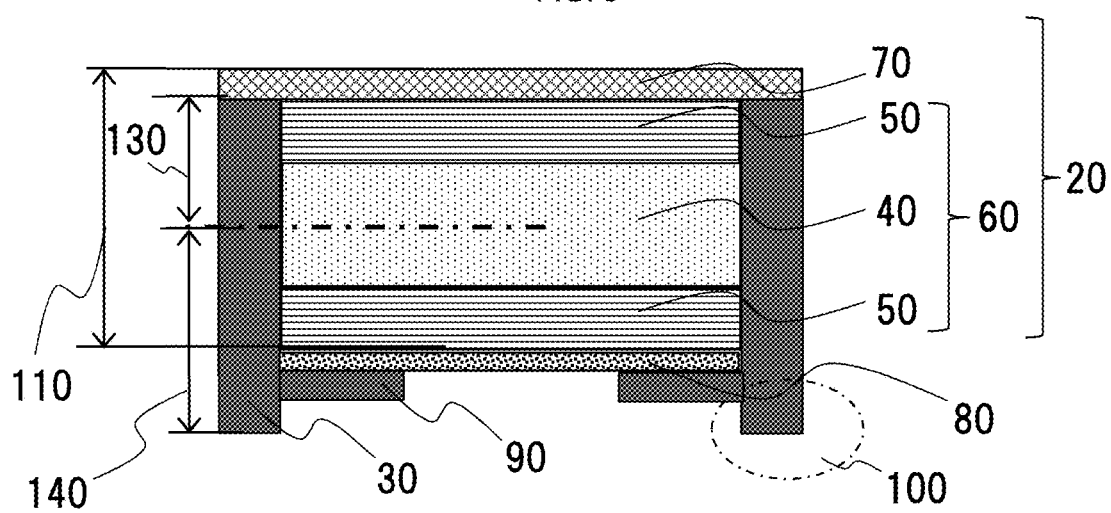
FIG. 5 is a cross section view of an example of our fiber-reinforced plastic molded body of laminate (A) of which side face and flat section of outer peripheral edge section are joined with resin material (B) through a joint layer formed on a surface of unidirectional fiber-reinforced resin (D).

To control the warpage, it is important that resin material (B) 30 is joined with a part or a whole region of outer peripheral side face of laminate (A) 20 formed by press forming, as shown in FIG. 4a, 4b or 5. Resin material (B) 30 can be thermally contracted to offset the warpage of thermal contraction of laminate (A) 20 so that a good smoothness of fiber-reinforced plastic molded body 10 is achieved without warpage as a whole.

It is preferable that the fiber-reinforced plastic molded body has a warpage of 2.0% or less. The warpage of 2.0% or less can keep a high flatness of electronic device housing made of the fiber-reinforced plastic molded body 10 to achieve a high strength with thin material while preventing internal electronic parts from contacting to the housing.

Next, materials constituting fiber-reinforced plastic molded body 10 will be explained.

Unidirectional fiber-reinforced resin (D) 50 and woven fiber-reinforced resin (F) 70 may comprise a reinforcing fiber having a high strength or a high elastic modulus such as carbon fiber, glass fiber, alumina fiber, silicon carbide fiber and boron fiber. From viewpoints of high rigidity and lightness, it is preferable that the reinforcing fiber comprises carbon fiber having a high specific elastic modulus defined as a ratio of elastic modulus to density. The carbon fiber may be polyacrylonitrile (PAN)-based, pitch-based or cellulose-based carbon fiber, or may be hydrocarbon vapor phase epitaxy carbon fiber or graphite fiber. Two or more kinds of these can be used at the same time. From a viewpoint of balance between rigidity and price, it is preferable that it is the PAN-based carbon fiber.

From a viewpoint of high rigidity of fiber-reinforced plastic molded body 10, it is preferable that the reinforcing fiber of unidirectional fiber-reinforced resin (D) 50 has a tensile elastic modulus of 200 to 850 GPa. The tensile elastic modulus of reinforcing fiber of less than 200 GPa might not have a high rigidity enough to keep the lightness. The tensile elastic modulus of more than 850 GPa might be difficult to form fiber-reinforced resin by impregnating reinforcing fiber with matrix resin because of insufficient compressive strength of reinforcing fiber breakable easily. The tensile elastic modulus of the reinforcing fiber within the above-described preferable range can improve rigidity of laminate and productivity of reinforcing fiber.

It is preferable that the woven fiber-reinforced resin (F) 70 includes a plain weave, twill weave, satin weave or sateen weave. Woven fiber-reinforced resin (F) 70 characterized in its fiber pattern can exhibit a novel pattern of surface of carbon fiber woven fabric provided on the outermost layer (design side).

It is possible that the matrix resin of unidirectional fiber-reinforced resin (D) 50 or woven fiber-reinforced resin (F) 70 is either thermosetting or thermoplastic.

As to thermosetting resins, it is preferable that the matrix resin is unsaturated polyester resin, vinyl ester resin, epoxy resin, phenol resin (resol type), urea melamine resin, polyimide resin, maleimide resin or benzoxazine resin. Above all, epoxy resin is preferable from viewpoints of mechanical characteristics and heat resistance of molded body. To exhibit excellent mechanical characteristics, it is preferable that epoxy resin is contained as main component by 60 wt % or more in the resin composition.

As to thermoplastic resins, the matrix resin may be a polyester resin such as polybutylene terephthalate (PBT) resin, poly trimethylene terephthalate (PTT) resin and liquid crystalline polyester resin, a polyolefin resin such as polybutylene resin, polyoxymethylene (POM) resin, a polyarylene sulfide resin such as polyphenylene sulfide (PPS) resin, an amorphous resin such as polymethylmethacrylate (PMMA) resin, polyvinyl chloride (PVC) resin, polyphenylene ether (PPE) resin, polyimide (PI) resin, polyamide-imide (PAI) resin, polyetherimide (PEI) resin, polysulfone (PSU) resin, polyethersulfone resin and polyarylate (PAR) resin, phenolic resin, phenoxy resin, a thermoplastic elastomer such as polystyrene-based resin, polyolefin-based resin, polyurethane-based resin, polyester-based resin, polyamide-based resin, polybutadiene-based resin, polyisoprene system resin, the fluorinated resin and acrylonitrile system resin, or a copolymer or a modified resin thereof. Above all, it is preferably the polyolefin resin from a viewpoint of lightness of molded body obtained, the polyamide resin from a viewpoint of strength, the polycarbonate resin, the styrene-based resin or the amorphous resin such as modified polyphenylene ether-based resin from a viewpoint of surface appearance.

From viewpoints of formability and strength of laminate (A) 20, it is preferable that the unidirectional fiber-reinforced resin (D) 50 has a fiber weight content of 50 to 80 wt % and the woven fiber-reinforced resin (F) 70 has a fiber weight content of 40 to 70 wt %.

When unidirectional fiber-reinforced resin (D) 50 has a fiber weight content of less than 50 wt %, it might be difficult to exhibit the strength of laminate (A) 20. When unidirectional fiber-reinforced resin (D) 50 has a fiber weight content of more than 80 wt %, it might be difficult to handle the prepreg because of excessive amount of fiber. It is preferably 55 to 75 wt %, and is more preferably 60 to 70 wt %.

When woven fiber-reinforced resin (F) 70 has a fiber weight content of less than 40 wt %, it might be difficult to exhibit the strength of laminate (A) 20. When woven fiber-reinforced resin (F) 70 has a fiber weight content of more than 70 wt %, the design might deteriorate after molding because of insufficient amount of resin. It is preferably 45 to 65 wt %, and is more preferably 50 to 60 wt %.

It is preferable that layers of adjacent unidirectional fiber-reinforced resin (D) 50 are laminated to have fiber orientation direction different by 450 or 90°. With such a laminate configuration, fiber-reinforced plastic molded body 10 can be given sufficient rigidity and strength as well as light weight with thin material.

It is preferable that core layer (C) 40 is made of a resin foam or a porous base material comprising discontinuous fiber and thermoplastic resin. With such a configuration, fiber-reinforced plastic molded body 10 can be given light weight and high rigidity because of porous core layer (C) 40 having voids.

It is preferable that the resin foam is made of polyurethane resin, phenolic resin, melamine resin, acrylic resin, polyethylene resin, polypropylene resin, polyvinyl chloride resin, polystyrene resin, acrylonitrile-butadiene-styrene (ABS) resin, polyetherimide resin or polymethacryl imide resin. From a viewpoint of lightness, it is preferable that the resin foam is made of polyurethane resin, acrylic resin, polyethylene resin, polypropylene resin, polyetherimide resin or polymethacryl imide resin, having an apparent density smaller than that of skin layer.

When core layer (C) 40 is a composite comprising thermoplastic resin and discontinuous fiber, it is preferable that the composite is made by pressurizing and heating the discontinuous fiber and thermoplastic resin to a temperature of more than the softening point or melting point so that the discontinuous fiber is expanded in the thickness direction by so-called spring back of restoring force at the time of releasing residual stress of discontinuous fiber to form voids.

The discontinuous fiber constituting core layer (C) 40 may be made of the same kind of reinforcing fiber as the above-described continuous fiber. It is preferable that the discontinuous fiber has a fiber length of 1 mm or more and less than 150 mm. The fiber length of less than 1 mm might make it difficult for the discontinuous fiber to be used as a base material. The fiber length of 150 mm or more might cause uneven plate thickness of fiber-reinforced plastic molded body 10. The thermoplastic resin constituting core layer (C) 40 may be made of the same kind of resin as the above-thermoplastic resin.

It is preferable that resin material (B) 30 comprises thermoplastic resin and discontinuous carbon fibers or glass fibers. With this configuration, fiber-reinforced plastic molded body 10 can achieve a reduced warpage as well as a high joint strength between laminate (A) and resin material (B) 30 constituting fiber-reinforced plastic molded body 10.

It is preferable that the thermoplastic resin is selected from a group of polystyrene resin, polyamide resin, polycarbonate resin, polyester resin, polyethylene terephthalate resin, polyethylene resin and polypropylene resin. The thermoplastic resin as unidirectional fiber-reinforced resin (D) 50 or as woven fiber-reinforced resin (F) 70 constituting laminate (A) 20 can be integrated with melted resin component of resin material (B) 30 to achieve a strong joint strength to resin material (B) 30.

It is preferable that resin material (B) 30 has a fiber weight content of 5 to 30 wt %. This configuration can make fiber-reinforced plastic molded body 10 reduced in warpage with enhanced joint strength. The fiber weight content of less than 5 wt % might make it difficult to secure the strength of fiber-reinforced plastic molded body 10. The fiber weight content of more than 30 wt % might make it partially insufficient to charge resin material (B) 30 at the time of injection molding. It is more preferable that the fiber weight content is 8 to 28 wt %, preferably 12 to 25 wt %.

It is preferable that the discontinuous carbon fiber or the glass fiber has a weight average fiber length of 0.3 to 3 mm. The discontinuous fiber and continuous fiber are defined as follows. The continuous fiber is a reinforcing fiber contained in fiber-reinforced plastic molded body 10 by a substantively continuous distribution over the total length or the total width of fiber-reinforced plastic molded body 10. The discontinuous fiber consists of reinforcing fibers cut and distributed intermittently. Generally, unidirectional fiber-reinforced resin of reinforcing fiber impregnated with resin contains continuous fibers while SMC base material used for press forming and pellet material used for injection molding contain discontinuous fibers.

The pellet containing discontinuous fibers are categorized as long fiber pellet or short fiber pellet. Long fiber means discontinuous fibers having a weight average fiber length of 0.3 mm or more contained in fiber-reinforced plastic molded body 10 while short fiber means discontinuous fibers having a weight average fiber length of less than 0.3 mm.

When reinforcing fibers left in resin material (B) 30 are long fibers, offset advantage of warpage of fiber-reinforced plastic molded body 10 can be enhanced. When the reinforcing fibers are short fibers having a length of less than 0.3 mm, strength of resin material (B) 30 might tend to decrease. The weight average fiber length of more than 3 mm might increase viscosity of resin and make it difficult to uniformly charge resin material (B) 30 into corners of molding die at the time of injection molding. It is preferable that the discontinuous carbon fiber or the glass fiber has a weight average fiber length of 0.4 to 2.8 mm. It is more preferably 0.7 to 1.5 mm, preferably 0.9 to 1.2 mm.

It is preferable that a ratio of Am2/Am1 is 2 to 25, wherein the Am1 (g) is a partial weight of resin material (B) existing in a design side region (R1) while the Am2 (g) is a partial weight of resin material (B) 30 existing in a non-design side region (R2), when the laminate (A) 20 is equally divided with respect to the center line in the material thickness direction into the design side region (R1) and the non-design side region (R1).

In FIGS. 4a, 4b and 5, the chain line of core layer (C) 40 is center line 120 equally dividing material thickness 100 of laminate (A). The Am2/Am1 of less than 2 might not offset the warpage sufficiently. The Am2/Am1 of more than 25 might make it difficult to achieve thin material because of material thickness of molded body in itself. It is preferable that the Am2/Am1 is 5 to 22. It is more preferably 8 to 20, preferably 10 to 18. It is preferable that resin material (B) 30 is joined to an outer peripheral side face of laminate (A) 20 by injection molding. Besides, the amount of resin material (B) can be determined by volume.

To control the Am2/Am1 within the range of 2 to 25, it is preferable that resin material (B) 30 is provided with a standing-wall section. As shown in FIGS. 4a, 4b and 5, fiber-reinforced plastic molded body 10 having a box shape can be prepared by providing resin material (B) 30 of side face of fiber-reinforced plastic molded body 10 with standing-wall section 100 extending downward from it.

It is preferable that sandwich structure material (E) 60 has a flexural rigidity greater than that of woven fiber-reinforced resin (F) 70. When the sandwich structure material (E) 60 having the greater flexural rigidity is laminated, the strength of fiber-reinforced plastic molded body 10 can be secured and the warpage generation can be suppressed even for asymmetric layer structure. The flexural rigidity can be calculated by the formula of "Rigidity=Elastic modulus× Second moment of area", meaning difficulty of material deformation. Therefore, it is understood that the flexural rigidity reflects warpage related to thickness and shape of base material.

It is preferable that a ratio of Md/Mf is 1.2 to 17, where the Md (GPa) is a flexural modulus of unidirectional fiber-reinforced resin (D) 50 while the Mf (GPa) is a flexural modulus of woven fiber-reinforced resin (F) 70. The ratio within the preferable range can secure the strength of molded body and offset the warpage. The Md/Mf of less than 1.2 might not reduce warpage sufficiently. The Md/Mf of more than 17 might not reduce warpage sufficiently either. It is more preferable that the Md/Mf is 3 to 16, further preferably 5 to 15 or 7 to 14.

It is preferable that unidirectional fiber-reinforced resin (D) 50 has a flexural modulus Md of 100 to 500 GPa while woven fiber-reinforced resin (F) 70 has a flexural modulus Mf of 30 to 80 GPa. The flexural modulus Md of less than 100 GPa might curve laminate (A) 20 excessively to make insufficient junction with resin material (B) 30 at the time of injection molding with resin material (B) 30. The flexural modulus Md of more than 500 GPa might make handling of base material hard and increase the cost to deteriorate product competitiveness.

The flexural modulus Mf of less than 30 GPa might not sufficiently secure the strength of fiber-reinforced plastic molded body 10. The flexural modulus Mf of more than 80 GPa might curve laminate (A) 20 excessively to make insufficient junction with resin material (B) 30 at the time of injection molding with resin material (B) 30.

It is preferable that the Md is 120 to 480 GPa. It is more preferably 180 to 400 GPa, preferably 220 to 320 GPa. It is preferable that the Mf is 35 to 75 GPa. It is more preferably 45 to 65 GPa, preferably 50 to 60 GPa.

It is preferable that a ratio of Te/Tf is 1.2 to 40, where Te (mm) is a material thickness of sandwich structure material (E) 60 made by sandwiching both sides of core layer (C) 40 by unidirectional fiber-reinforced resin (D) 50 while Tf (mm) is a material thickness of woven fiber-reinforced resin (F) 70.

When the material thickness of sandwich structure material (E) 60 including unidirectional fiber-reinforced resin (D) 50 is greater than the material thickness of woven fiber-reinforced resin (F) 70, effect of thermal contraction of woven fiber-reinforced resin (F) 70 can be suppressed.

The Te/Tf of less than 1.2 might not sufficiently offset warpage. The Te/Tf of more than 40 might make it difficult to achieve thin material products because of material thickness of the molded body itself. It is preferable that the Te/Tf is 2 to 35. It is more preferably 5 to 32, preferably 8 to 30.

It is preferable that sandwich structure material (E) 60 has a material thickness Te of 0.6 to 2 mm while woven fiber-reinforced resin (F) 70 has a material thickness Tf of 0.05 to 0.5 mm. Such ranges of material thickness can achieve offset of warpage by using thin materials.

The Te of less than 0.6 mm might decrease strength of molded body in itself. The Te of more than 2 mm might make it difficult to achieve products with thin material because of plate thickness of molded body itself. The Tf of less than 0.05 mm might cause a defect of appearance. The Tf of more than 0.5 mm might make it difficult to achieve products with thin material because of plate thickness of molded body itself.

It is preferable that the Te is 0.7 to 1.8 mm and Tf is 0.06 to 0.4 mm. It is more preferable that the Te is 0.9 to 1.6 mm and Tf is 0.08 to 0.3 mm, preferably the Te being 1 to 1.4 mm and the Tf being 0.1 to 0.2 mm.

It is preferable that laminate (A) 20 and resin material (B) 30 are joined through joint layer (G) 80 provided in a part or a whole region of outer peripheral edge section of unidirectional fiber-reinforced resin (D) 50 at the non-design side of laminate (A) 20. As shown in FIG. 5, joint layer (G) 80 is attached to the surface of unidirectional fiber-reinforced resin (D) 50 at the side of non-design side of laminate (A) 20. When resin material (B) 30 is injected into a die, joint layer (G) 80 melted with heat of hot-melt resin material (B) 30 can be integrated with resin material (B) 30. Such obtained fiber-reinforced plastic molded body 10 can achieve a high joint strength.

As shown in FIG. 5, resin material (B) 30 partially extends from outer peripheral side face of laminate (A) 20 to the outer peripheral edge section (resin material (B) 90) of laminate (A) 20 pasted with joint layer (G) 80 to join joint layer (G) 80. Such extended joint surface can exhibit a stronger joint strength.

Joint layer (G) 80 can be made of thermoplastic resin film or thermoplastic resin nonwoven fabric, although it is not limited in particular.

It is preferable that resin material (B) 30 exists in region (R2) 140 more than in region (R1) 130, wherein laminate (A) 20 is evenly divided by center line 120 to region (R1) 130 where woven fiber-reinforced resin (F) 70 is laminated and region (R2) 140 where woven fiber-reinforced resin (F) 70 is not laminated. Such a difference of resin material (B) 30 joined with outer peripheral edge section and/or outer peripheral side face section of fiber-reinforced plastic molded body 10 can offset a whole warpage by stress generated by contraction of resin material (B) 30 in the direction opposite to the warpage of laminate (A) 20. As a result, warpage generation can be suppressed at the time of forming process even for asymmetric laminate.

Figure 6:
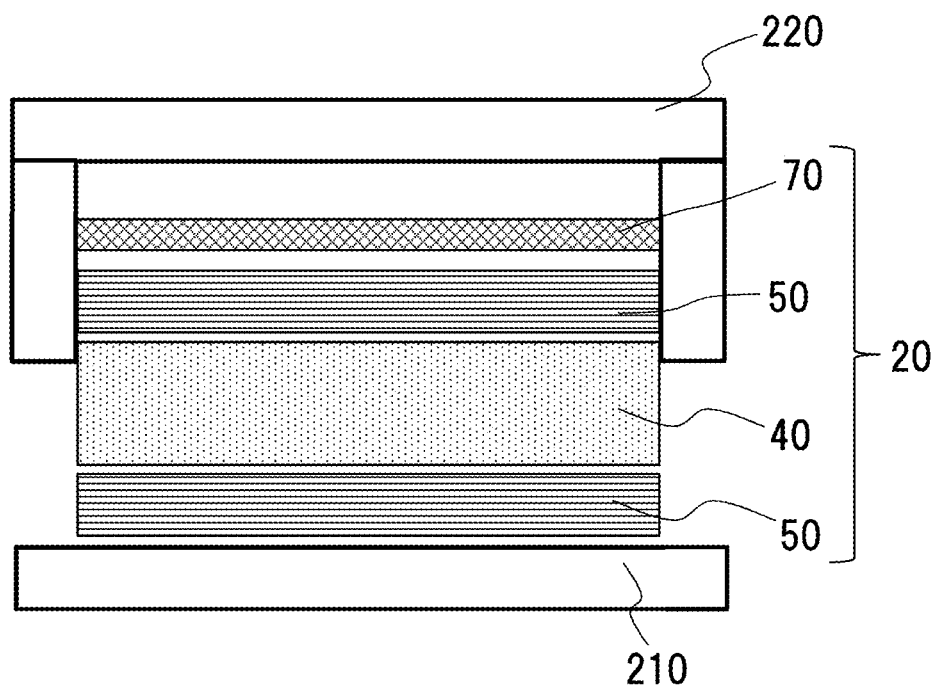
FIG. 6 is a cross section view showing a process of manufacturing laminate (A) before each member of laminate (A) is placed in a lower die for press forming.

Next, our manufacturing method of fiber-reinforced plastic molded body will be explained with reference to the figures. Fiber-reinforced plastic molded body 10 shown in FIG. 4a or 4b can be manufactured in methods shown in FIGS. 6 to 8. As shown in FIG. 6, precursor of laminate (A) 20 is formed by laminating preliminarily prepared woven fiber-reinforced resin (F) 70, unidirectional fiber-reinforced resin (D) 50, core layer (C) 40 and unidirectional fiber-reinforced resin (D) 50 on press forming lower die 210 in this order. It is preferable that woven fiber-reinforced resin (F) 70 and unidirectional fiber-reinforced resin (D) 50 is configured to have any of the following formation: prepreg of reinforcing fiber with thermosetting resin; UD tape containing thermoplastic resin; or woven fabric.

Figure 7:
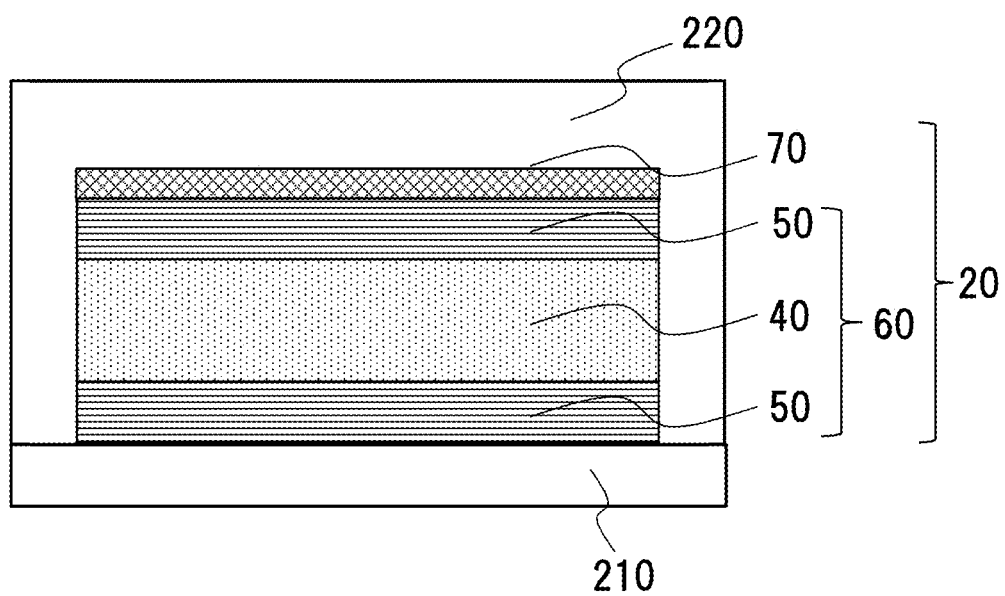
FIG. 7 is a cross section showing laminate (A) prepared by press forming with a closed lower die and an upper die for press forming.

Then, as shown in FIG. 7, press forming upper die 220 is descended to a position to contact unidirectional fiber-reinforced resin (D) 50 so that precursor of laminate (A) 20 is subject to a compression molding at a predetermined pressure to make laminate (A) 20. At the time of compression molding, mold release film (not shown) can be interposed between the die and precursor of laminate (A) 20 for supporting the release.

Figure 8A:
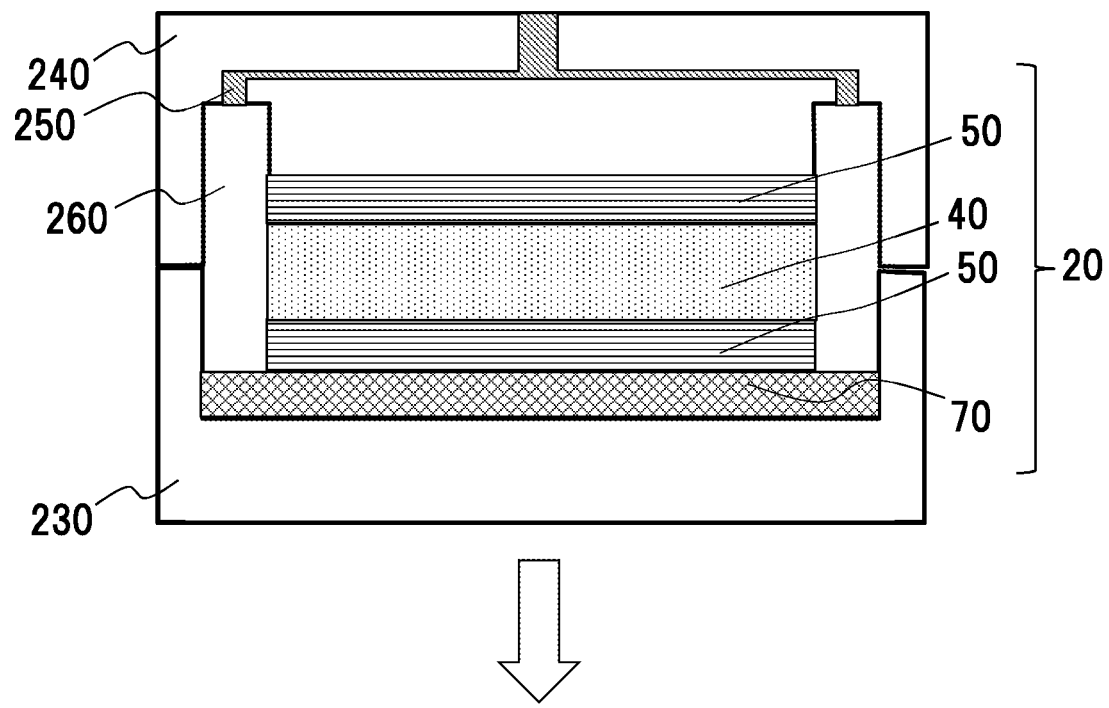
FIGS. 8a-8b are a process chart showing a manufacturing process of our fiber-reinforced plastic molded body, where
Figure 8B:
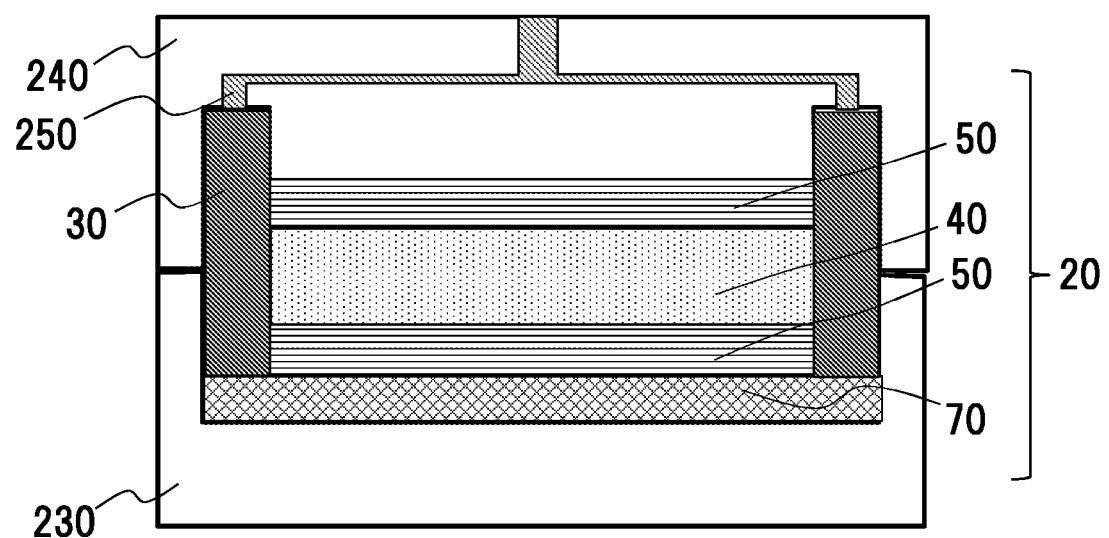

Next, as shown in FIG. 8a, laminate (A) 20 is placed between injection molding upper die (MM1) 240 and injection molding lower die (M1) 230 which has space 260 for molding resin material (B) 30. Next, as shown in FIG. 8b, resin material (B) 30 comprising reinforcing fiber and thermoplastic resin is injected from injection gate 250. Thus, resin material (B) 30 is integrally joined with side face of laminate (A) 20.

Figure 9:
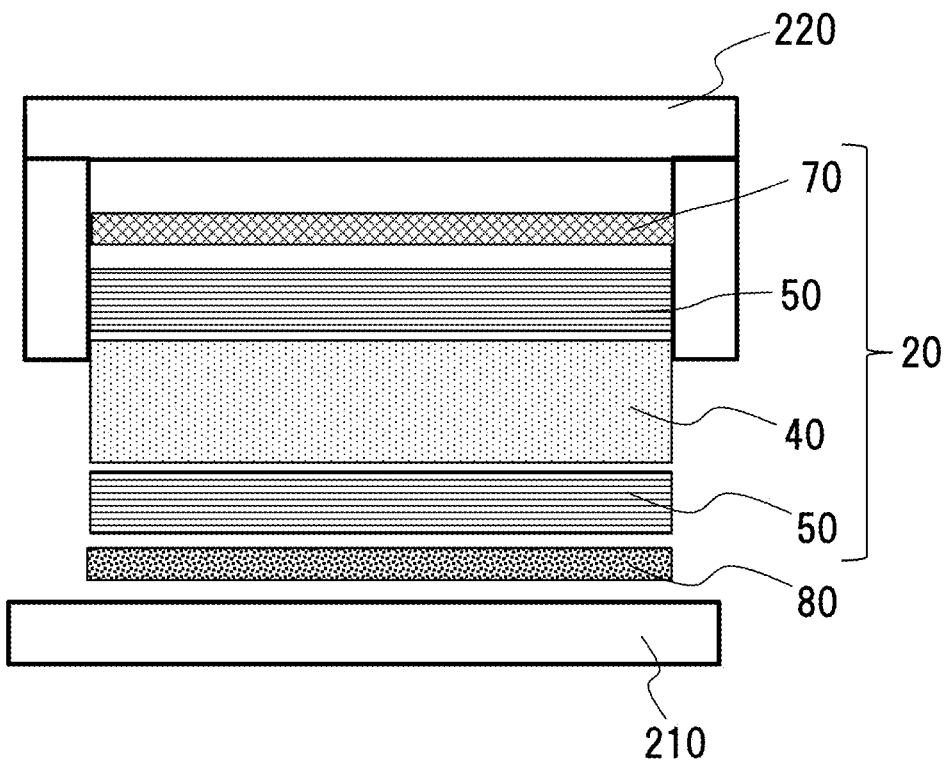
FIG. 9 is a process chart showing a manufacturing process of our fiber-reinforced plastic molded body of laminate (A) of which even a flat section of outer peripheral edge section is joined with resin material (B) through joint layer (G) before each member of laminate (A) is placed in a lower die for press forming.
Figure 10:
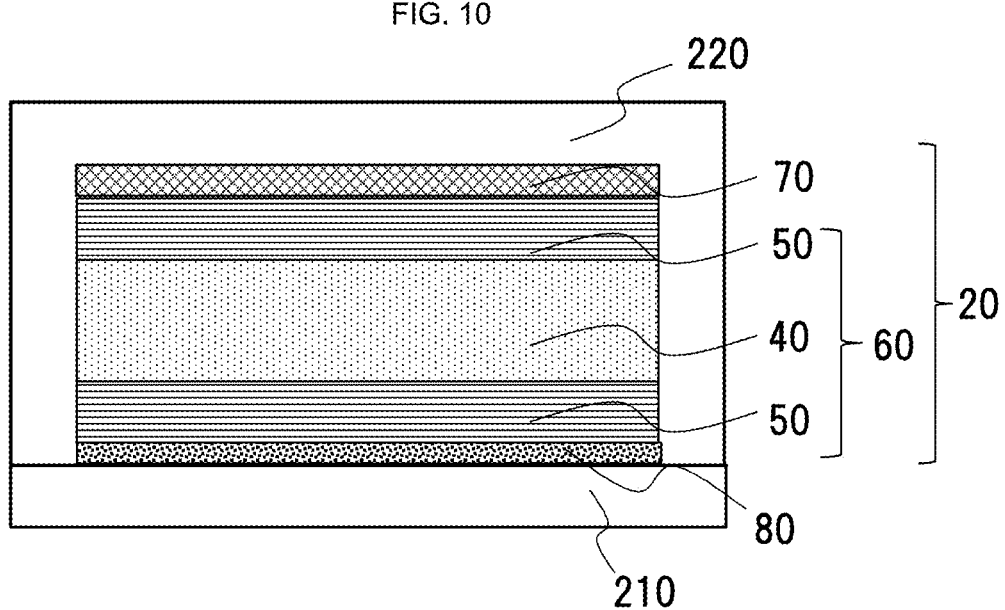
FIG. 10 is a process chart showing a process following the process of FIG. 9, in which laminate (A) is prepared by press forming with a closed lower die and an upper die for press forming.

FIGS. 9 to 11 show examples of manufacturing method of our fiber-reinforced plastic molded body made by joining resin material (B) 90 even with a flat section of outer peripheral edge section through joint layer (G) 80 shown in FIG. 5. As shown in FIG. 9, preliminarily prepared woven fiber-reinforced resin (F) 70, unidirectional fiber-reinforced resin (D) 50, core layer (C) 40, unidirectional fiber-reinforced resin (D) 50 and joint layer (G) are laminated on press forming lower die 210 in this order.

Then, as shown in FIG. 10, press forming upper die 220 is descended to a position to contact joint layer (G) 80 so that laminate (A) 20 is subject to a compression molding at a predetermined pressure to make laminate (A) 20.

Next, as shown in FIG. 11a, laminate (A) 20 is placed between injection molding upper die (MM2) 240 and injection molding lower die (M1) 230 which has space 26 for molding resin material (B) 30. Next, as shown in FIG. 11b, resin material (B) 30 comprising reinforcing fiber and thermoplastic resin is injected from injection gate 250. Thus, resin material (B) 30 is integrally joined with side face of laminate (A) 20 while being integrally joined with flat section of outer peripheral edge section of laminate (A) 20 through joint layer (G) 80.

In FIG. 12a, laminate (A) 20 is placed between injection molding upper die (MM2) 241 and injection molding lower die (M2) 231 which has space 260 for molding resin material (B) 30. Next, as shown in FIG. 12b, resin material (B) 30 comprising reinforcing fiber and thermoplastic resin is injected from injection gate 250. Thus, resin material (B) 30 is integrally joined with side face of laminate (A) 20 while being integrally joined with flat section of outer peripheral edge section of laminate (A) 20 through joint layer (G) 80.

EXAMPLES

Hereinafter, our fiber-reinforced plastic molded body 10 will be explained in more detail with reference to examples, although it is not limited in particular. First, measurement methods of our characteristics and material composition examples of each part of fiber-reinforced plastic molded body 10 will be explained.

(1) Measurement of Number Average Fiber Length

Number average fiber length Ln of reinforcing fibers contained in resin material (B) 30 or core layer (C) 40 is determined as described below. Resin material (B) or core layer (C) 40 partially cut out of fiber-reinforced plastic molded body 10 is heated for 60 min at 500° C. in air in an electric furnace to isolate reinforcing fibers by incinerating resin to be removed sufficiently. Fibers of 400 or more are randomly-selected from the isolated reinforcing fibers and are subject to the measurement. The reinforcing fibers are observed with an optical microscope, and number average fiber length Ln is calculated by the formula below to an accuracy of 1 μm unit.

Number average fiber length $Ln=(\Sigma Li)/400$

Li: fiber length (mm)

(2) Measurement of Fiber Weight Content

Fiber weight content of woven fiber-reinforced resin (F) 70, unidirectional fiber-reinforced resin (D) 50, core layer (C) 40 or resin material (B) 30 constituting laminate (A) 20 is measured as described below. Woven fiber-reinforced resin (F) 70, unidirectional fiber-reinforced resin (D) 50, core layer (C) 40 or resin material (B) 30 cut out of fiber-reinforced plastic molded body 10 is subject to measurement of weight w0 (g). Then, the cut-out sample is heated in air at 500° C. for 1 hour to isolate reinforcing fibers by incinerating resin to be removed sufficiently, and weight w1 (g) of the residual reinforcing fibers is measured. Fiber weight content (wt %) is calculated by the formula below. Three times of measurement is performed to calculate an average.

Fiber weight content (wt %)=(reinforcing fiber weight $w1(g)$/cut-out sample weight $w0(g)$)×100

(3) Measurement of Flexural Rigidity and Flexural Modulus

Bending elastic modulus Md of unidirectional fiber-reinforced resin (D) 50 and flexural modulus Mf of woven fiber-reinforced resin (F) 70 are measured according to JIS K7171. The flexural rigidity of each material is calculated by the formula of "Bending elastic modulus×Second moment of area/Plate width".

(4) Measurement of Warpage

Figure 13:
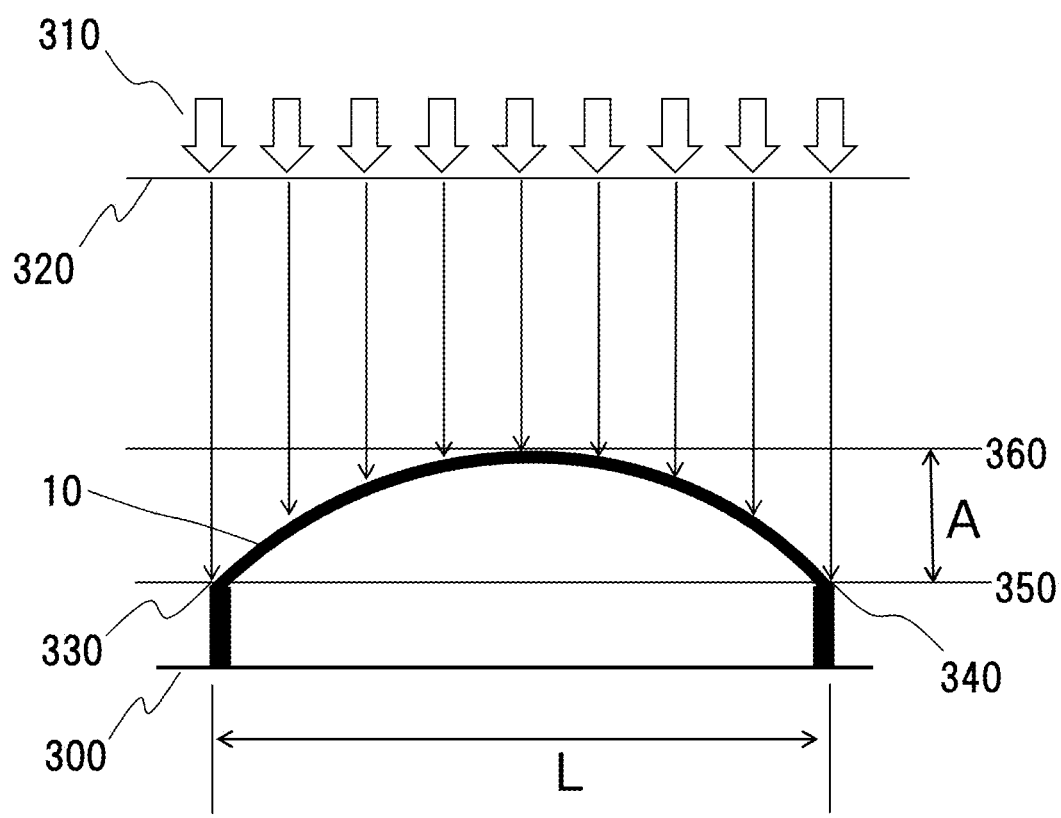
FIG. 13 is a schematic explanation view showing a measurement method of warpage of our fiber-reinforced plastic molded body.

FIG. 13 shows a method of measuring the state of warpage of fiber-reinforced plastic molded body 10. The warpage of fiber-reinforced plastic molded body 10 is measured by using a laser distance measurer made by BOSCH company. First, fiber-reinforced plastic molded body 10 is placed on flat plate 300 kept horizontal. Next, datum level 320 on which laser distance measurer 310 can move above fiber-reinforced plastic molded body 10 is provided.

Then, the distances from datum level 320 to endmost edges 330 and 340 of fiber-reinforced plastic molded body 10 are measured while the line drawn between both endmost edges 330 and 340 is defined as warpage lower datum line 350. For example, each of four sides is subject to measurement when fiber-reinforced plastic molded body 10 is rectangular. The measurement spot irradiated a laser near four sides of peripheral edges of laminate (A) 20. The edges are direct ends of laminate (A) 20, not including resin material (B) 30.

Then, laser distance measurer 310 is moved stepwise by predetermined equal intervals between both endmost edges 330 and 340 and measures each distance between datum level and fiber-reinforced plastic molded body 10. FIG. 13 shows seven measurement points. The line drawn in parallel with warpage lower datum line 350 from the point of fiber-reinforced plastic molded body 10 closest to datum level 320 is defined as warpage upper datum line 360. The warpage is determined by the formula of (A/L)×100(%), where L (mm) is distance between both endmost edges 330 and 340 while A (mm) is distance between warpage lower datum line 350 and warpage upper datum line 360.

Material Composition Example 1-1 Preparation of Unidirectional Fiber-Reinforced Resin (D) 50

The following unidirectional fiber-reinforced resins (D) 50 are prepared by impregnating a sheet of unidirectionally oriented PAN-based carbon fiber bundle with epoxy resin: Unidirectional prepreg (D-1) (made by Toray Industries, Inc., P3452S-15, carbon fiber weight content of 67%, tensile elastic modulus of 235 GPa, thickness of 0.15 mm); Unidirectional prepreg (D-2) (made by Toray Industries, Inc., P3452S-10, carbon fiber weight content of 67%, tensile elastic modulus of 235 GPa, thickness of 0.10 mm); and Unidirectional prepreg (D-3) (made by Toray Industries, Inc., P12453F-16, carbon fiber weight content of 67%, tensile elastic modulus of 550 GPa, thickness of 0.15 mm). Also prepared is unidirectional prepreg (D-4) (made by Toray Industries, Inc., P12453F-11, carbon fiber weight content of 67%, tensile elastic modulus of 550 GPa, thickness of 0.10 mm).

Material Composition Example 1-2 Preparation of Woven Fiber-Reinforced Resin (F) 70

The following woven fiber-reinforced resin (F) 70 is prepared from woven carbon fiber having tensile elastic modulus of 230 GPa and epoxy resin having glass transition temperature of 230 GPa: Woven prepreg (F-1) having basis weight of 198 g/m2, carbon fiber content of 56 wt % and thickness 0.10 mm.

Material Composition Example 2-1 Preparation of Core Layer (C) 40

Core layer (C-1) 4 is prepared from foamed polypropylene (made by Toray Industries, Inc., RC2012W).

Material Composition Example 2-2 Preparation of Core Layer (C) 40

The following porous base material is prepared from discontinuous fiber (made by Toray Industries, Inc., T700S, carbon fiber having number average fiber length of 5 mm) and thermoplastic resin (polypropylene): Core layer (C-2) 4 made of discontinuous fiber having weight content of 30 wt %.

Material Composition Example 3 Preparation of Resin Material (B) 30

Resin material (B-1) 3 is prepared from glass fiber pellet for injection molding (made by Teijin Limited, GXV3540-UI, glass fiber, number average fiber length of 0.2 mm, polycarbonate resin, fiber weight content of 40 wt %).

Resin material (B-2) 3 is prepared from glass fiber pellet for injection molding (made by Toray Industries, Inc., A503-F1, glass fiber, number average fiber length of 0.2 mm, PPS resin, fiber weight content of 30 wt %).

Material Composition Example 4 Preparation of Joint Layer (G) 80

Polyester resin ("HYTREL" (registered trademark) 4057 made by Du Pont-Toray Co., Ltd.) fed from a hopper into a twin extruder is melt-kneaded and extruded from T-shaped die. Then, it is solidified by cooling with chill-roll to take up at 60° C. to prepare a polyester resin film having thickness of 0.05 mm. It is used as thermoplastic joint layer (G) 80.

Example 1

Unidirectional prepreg prepared in Material composition example 1-1 and foamed polypropylene prepared in Material composition example 2-1 were laminated in the order of [unidirectional prepreg (D-1) 0°/unidirectional prepreg (D-2) 90°/foamed polypropylene/unidirectional prepreg (D-2) 90°/unidirectional prepreg (D-1) 0°] to prepare a precursor of sandwich structure material (E) 60 having a shape of rectangle of 304 mm×304 mm. Next, woven prepreg (F-1) 70 of 2 ply of 304 mm×304 mm×0.1 mmt prepared in Material composition example 1-2 was laminated on one side of precursor of sandwich structure material (E) 60 to prepare a precursor of laminate (A) 20. Flexural modulus Md of unidirectional fiber-reinforced resin (D) 50 was determined from the elastic modulus of hardened prepreg having layers of [unidirectional prepreg (D-1) 0°/unidirectional prepreg (D-2) 90°] laminated onto core layer (C) 50.

Next, as shown in FIG. 6, the precursor of laminate (A) 20 was sandwiched by release film (not shown) and placed on press forming lower die 210 having a rectangular shape of 310 mm×310 mm. Then, as shown in FIG. 7, it was set with press forming upper die 220 and placed on a board at 150° C. of board surface to be closed for hot pressing at 3 MPa. After 5 minute pressurization, the board surface was opened to obtain laminate (A-1) 20 of carbon fiber-reinforced resin plate having a rectangular flat plate shape of 304 mm×304 mm and thickness of 1.8 mm.

Then, as shown in FIG. 3a, outer periphery of sandwich structure material (E) 60 was processed by an NC processing machine to obtain laminate (A) in which total width of only the layer of woven fiber-reinforced resin (F) 70 was extended from sandwich structure material (E) 60.

Then, as shown in FIG. 8a, laminate (A-1) 20 was placed in a space formed by injection molding lower die 230 and injection molding upper die 240. As shown in FIG. 8b, resin material (B-1) 30 prepared in Material composition example 3 was injected from injection gate 250 to make Am1/Am2 to 20 to obtain fiber-reinforced plastic molded body 10 of which 3 mm width of resin material (B-1) 30 was exposed from the projection plane.

Example 2

Unidirectional prepreg prepared in Material composition example 1-1 and foamed polypropylene prepared in Material composition example 2-1 were laminated in the order of [unidirectional prepreg (D-1) 0°/unidirectional prepreg (D-2) 90°/foamed polypropylene/unidirectional prepreg (D-2) 90°/unidirectional prepreg (D-1) 0°] to prepare a precursor of sandwich structure material (E) 60 having a shape of rectangle of 310 mm×310 mm. Next, woven prepreg (F-1) 70 of 2 ply of 310 mm×310 mm×0.1 mmt prepared in Material composition example 1-2 was laminated on one side of precursor of sandwich structure material (E) 60 to prepare a precursor of laminate (A) 20. Flexural modulus Md of unidirectional fiber-reinforced resin (D) 50 was determined from the elastic modulus of hardened prepreg having layers of [unidirectional prepreg (D-1) 0°/unidirectional prepreg (D-2) 90°] laminated onto core layer (C) 50.

Next, as shown in FIG. 6, the precursor of laminate (A) 20 was sandwiched by release film (not shown) and placed on press forming lower die 210 having a rectangular shape of 310 mm×310 mm. Then, as shown in FIG. 7, it was set with press forming upper die 220 and placed on a board at 150° C. of board surface to be closed for hot pressing at 3 MPa. After 5 minute pressurization, the board surface was opened to obtain laminate (A-1) 20 of carbon fiber-reinforced resin plate having a rectangular flat plate shape of 310 mm×310 mm and thickness of 0.5 mm.

Then, as shown in FIG. 3a, outer periphery of sandwich structure material (E) 60 was processed by an NC processing machine to obtain laminate (A) in which total width of only the layer of woven fiber-reinforced resin (F) 70 was extended from sandwich structure material (E) 60.

Then, as shown in FIG. 12a, laminate (A-1) 20 was placed in a space formed by injection molding lower die 231 and injection molding upper die 241. As shown in FIG. 12b, resin material (B-1) 30 prepared in Material composition example 3 was injected from injection gate 250 to make Am1/Am2 to 20 to obtain fiber-reinforced plastic molded body 10 having excellent design of which woven fiber-reinforced resin (F) 70 was covered toward the non-design side.

Example 3

Unidirectional prepreg prepared in Material composition example 1-1 and porous base material prepared in Material composition example 2-2 were laminated in the order of [unidirectional prepreg (D-1) 0°/unidirectional prepreg (D-2) 90°/porous base material/unidirectional prepreg (D-2) 90°/unidirectional prepreg (D-1) 0°] to prepare a precursor of sandwich structure material (E) 60 having a shape of rectangle of 310 mm×310 mm. Next, woven prepreg (F-1) 70 of 1 ply of 310 mm×310 mm×0.1 mmt prepared in Material composition example 1-2 was laminated on one side of precursor of sandwich structure material (E) 60 to prepare a precursor of laminate (A) 20. Flexural modulus Md of unidirectional fiber-reinforced resin (D) 50 was determined from the elastic modulus of hardened prepreg having layers of [unidirectional prepreg (D-1) 0°/unidirectional prepreg (D-2) 90°] laminated onto core layer (C) 50.

Next, as shown in FIG. 6, the precursor of laminate (A) 20 was sandwiched by release film (not shown) and placed on press forming lower die 210 having a rectangular shape of 310 mm×310 mm. Then, as shown in FIG. 7, it was set with press forming upper die 220 and placed on a board at 150° C. of board surface to be closed for hot pressing at 3 MPa. After 5 minute pressurization, the board surface was opened to obtain laminate (A-1) 20 of carbon fiber-reinforced resin plate having a rectangular flat plate shape of 310 mm×310 mm and thickness of 0.5 mm.

Then, as shown in FIG. 3b, outer periphery of sandwich structure material (E) 60 was processed by an NC processing machine to obtain laminate (A) in which the layer of woven fiber-reinforced resin (F) 70 and a part of layers of sandwich structure material (E) 60 were extended.

Then, as shown in FIG. 12a, laminate (A-1) 20 was placed in a space formed by injection molding lower die 231 and injection molding upper die 241. As shown in FIG. 12b, resin material (B-1) 30 prepared in Material composition example 3 was injected from injection gate 250 to make Am1/Am2 to 20 to obtain fiber-reinforced plastic molded body 10 having excellent design of which woven fiber-reinforced resin (F) 70 was covered toward the non-design side.

Example 4

Laminate (A-1) 20 was prepared by the same configuration as Example 1, except that the size is 308 mm×305 mm. Then, as shown in FIG. 12a, laminate (A-1) 20 was placed in a space formed by injection molding lower die 231 and injection molding upper die 241. As shown in FIG. 12b, resin material (B-1) 30 prepared in Material composition example 3 was injected from injection gate 250 to make Am1/Am2 to 22 to obtain fiber-reinforced plastic molded body 10 having excellent design of which woven fiber-reinforced resin (F) 70 was covered toward the non-design side and of which 2 to 5 mm width of resin material (B) was exposed.

Comparative Example 1

Laminate (A-1) 20 was prepared by the same configuration as Example 1, except that the size is 270 mm×270 mm. Then, the injection molding was performed in the same condition as Example 1, to obtain fiber-reinforced plastic molded body 10 having poor design characteristics of which 20 mm width of resin material (B-1) 30 was exposed on the design side.

Table 1 shows results of the above-described examples.

TABLE 1

| | | Unit | Example 1 | Example 2 | Example 3 | Example 4 | Comparative example 1 |
|---|---|---|---|---|---|---|---|
| Product Size | Fiber-reinforced plastic molded body | mm | 310 mm × 310 mm | 310 mm × 310 mm | 310 mm × 310 mm | 310 mm × 310 mm | 310 mm × 310 mm |
| | Laminate (A) | mm | 304 mm × 304 mm | 310 mm × 310 mm | 310 mm × 310 mm | 305 mm × 308 mm | 270 mm × 270 mm |
| Width of resin member (B) viewed from projection plane | | mm | 3 mm | 0 mm Covered even on non-design side | 0 mm | 2-5 mm | 20 mm |

INDUSTRIAL APPLICATIONS

Our fiber-reinforced plastic molded bodies can be effectively used as automotive interior/exterior material, electric/electronic equipment housings, constructional material for bicycles or sporting gear, airplane interior material, housings for transportation or the like.

The invention claimed is:

1. A fiber-reinforced plastic molded body comprising: a laminate (A) having a planar structure of a fiber-reinforced resin; and a resin material (B) joined with a part or a whole region of an outer peripheral side face of the laminate (A), the laminate (A) having layers of:
a sandwich structure material (E) made by laminating one or more layers of a unidirectional fiber-reinforced resin (D) of a unidirectional continuous fiber and a matrix resin on both surfaces of a core layer (C); and
one or more layers of a woven fiber-reinforced resin (F) of woven fiber and a matrix resin laminated on a surface of a design side of the unidirectional fiber-reinforced resin (D), wherein the resin material (B) is not substantially exposed in a projection plane from the woven fiber-reinforced resin (F).

2. The fiber-reinforced plastic molded body according to claim 1, wherein the woven fiber-reinforced resin (F) or both the woven fiber-reinforced resin (F) and the unidirectional fiber-reinforced resin (D) laminated on the woven fiber-reinforced resin (F) has an extended section of which width is more than a full width of the core layer (C) and which covers the resin material (B).

3. The fiber-reinforced plastic molded body according to claim 2, further comprising a first curved section of the extended section curved to cover the resin material (B).

4. The fiber-reinforced plastic molded body according to claim 3, wherein the first curved section or the second curved section covers at least a part of an outer edge of the resin material (B).

5. The fiber-reinforced plastic molded body according to claim 1, wherein an end of the laminate (A) has a second curved section to cover the resin material (B).

6. The fiber-reinforced plastic molded body according to claim 1, wherein a ratio of Am2/Am1 is 2 to 25, Am1 is a partial weight of the resin material (B) existing in a design side region (R1) while Am2 is a partial weight of the resin material (B) existing in a non-design side region (R2), when the laminate (A) is equally divided with respect to a center line in a thickness direction into the design side region (R1) and the non-design side region (R2).

7. The fiber-reinforced plastic molded body according to claim 1, wherein the sandwich structure material (E) has a flexural rigidity greater than that of the woven fiber-reinforced resin (F).

8. The fiber-reinforced plastic molded body according to claim 1, wherein a ratio of Md/Mf is 1.2 to 17, Md is a flexural modulus of the unidirectional fiber-reinforced resin (D), and Mf is a flexural modulus of the woven fiber-reinforced resin (F).

9. The fiber-reinforced plastic molded body according to claim 1, wherein the unidirectional fiber-reinforced resin (D) has a flexural modulus Md of 100 to 500 GPa while the woven fiber-reinforced resin (F) has a flexural modulus Mf of 30 to 80 GPa.

10. The fiber-reinforced plastic molded body according to claim 1, wherein a ratio of Te/Tf is 1.2 to 40, Te is a material thickness of the sandwich structure material (E), and Tf is a material thickness of the woven fiber-reinforced resin (F).

11. The fiber-reinforced plastic molded body according to claim 1, wherein the sandwich structure material (E) has a material thickness Te of 0.6 to 2 mm while the woven fiber-reinforced resin (F) has a material thickness Tf of 0.05 to 0.5 mm.

12. The fiber-reinforced plastic molded body according to claim 1, wherein the laminate (A) and the resin material (B) are joined through a joint layer (G) provided in a part or a whole region of an outer peripheral edge section of the unidirectional fiber-reinforced resin (D) at a non-design side of laminate (A).

13. The fiber-reinforced plastic molded body according to claim 1, wherein the core layer (C) is made of a resin foam or a porous base material comprising a discontinuous fiber and a thermoplastic resin.

\* \* \* \* \*